(12) United States Patent
Nichols et al.

(10) Patent No.: US 9,004,850 B2
(45) Date of Patent: Apr. 14, 2015

(54) TWISTED VARIABLE INLET GUIDE VANE

(75) Inventors: Jason Nichols, Mississauga (CA); Hien Duong, Mississauga (CA); Peter Townsend, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 730 days.

(21) Appl. No.: 13/458,002

(22) Filed: Apr. 27, 2012

(65) Prior Publication Data

US 2013/0287542 A1  Oct. 31, 2013

(51) Int. Cl.

| | |
|---|---|
| F01D 9/04 | (2006.01) |
| F01D 1/04 | (2006.01) |
| F01D 9/02 | (2006.01) |
| F01D 5/14 | (2006.01) |
| F01D 17/16 | (2006.01) |
| F04D 29/56 | (2006.01) |

(52) U.S. Cl.
CPC .............. *F04D 29/563* (2013.01); *F01D 5/141* (2013.01); *F01D 17/165* (2013.01); *F05D 2250/70* (2013.01); *Y02T 50/673* (2013.01)

(58) Field of Classification Search
USPC .......... 415/1, 148, 150, 151, 152.2, 156, 159, 415/160, 163, 164, 165, 183, 186, 191, 192, 415/208.1, 208.2
See application file for complete search history.

(56) References Cited

U.S. PATENT DOCUMENTS

| | | | |
|---|---|---|---|
| 1,728,435 A | * | 9/1929 | Moody .......................... 415/161 |
| 2,029,813 A | | 2/1936 | De Mey |
| 2,914,241 A | * | 11/1959 | Novak ........................... 415/162 |
| 3,723,021 A | * | 3/1973 | Bartholomew ............... 415/147 |
| 3,745,629 A | | 7/1973 | Pask et al. |
| 4,029,433 A | * | 6/1977 | Penny et al. .................. 415/147 |
| RE31,259 E | | 5/1983 | Gopalakrishnan et al. |
| 4,428,714 A | | 1/1984 | Mowill |
| 4,436,481 A | | 3/1984 | Linder |
| 4,439,104 A | | 3/1984 | Edmonds |
| 4,531,356 A | | 7/1985 | Linder |
| RE32,756 E | | 9/1988 | Mowill |
| 4,844,695 A | | 7/1989 | Banks et al. |
| 5,228,832 A | | 7/1993 | Nishida et al. |
| 5,249,922 A | | 10/1993 | Sato et al. |
| 5,373,691 A | | 12/1994 | Gardner et al. |
| 6,007,297 A | | 12/1999 | Buchelt |
| 6,162,015 A | | 12/2000 | Nagai et al. |
| 6,508,630 B2 | | 1/2003 | Liu et al. |
| 7,121,792 B1 | | 10/2006 | Fessou et al. |
| 7,195,456 B2 | | 3/2007 | Aggarwala et al. |
| 7,520,716 B2 | | 4/2009 | Tacconelli et al. |
| 7,547,186 B2 | | 6/2009 | Schuster et al. |
| 7,794,201 B2 | | 9/2010 | Burton et al. |
| 7,806,653 B2 | | 10/2010 | Burton et al. |
| 2013/0236319 A1 | * | 9/2013 | Rockarts et al. .......... 416/223 R |

* cited by examiner

*Primary Examiner* — Igor Kershteyn
(74) *Attorney, Agent, or Firm* — Norton Rose Fulbright Canada

(57) ABSTRACT

A compressor for a gas turbine engine with variable inlet guide vanes each defining an airfoil portion twisted such that at each location of the airfoil portion along the pivot axis, an angle is defined between a respective chord extending between the leading and trailing edges and a same reference plane containing the pivot axis and extending radially with respect to the compressor. The angle, which is measured along a direction of rotation of the rotor, varies from a minimum value near the hub side wall to a maximum value near the shroud side wall. A method of reducing vortex whistle in a radial inlet of a compressor is also provided.

20 Claims, 7 Drawing Sheets

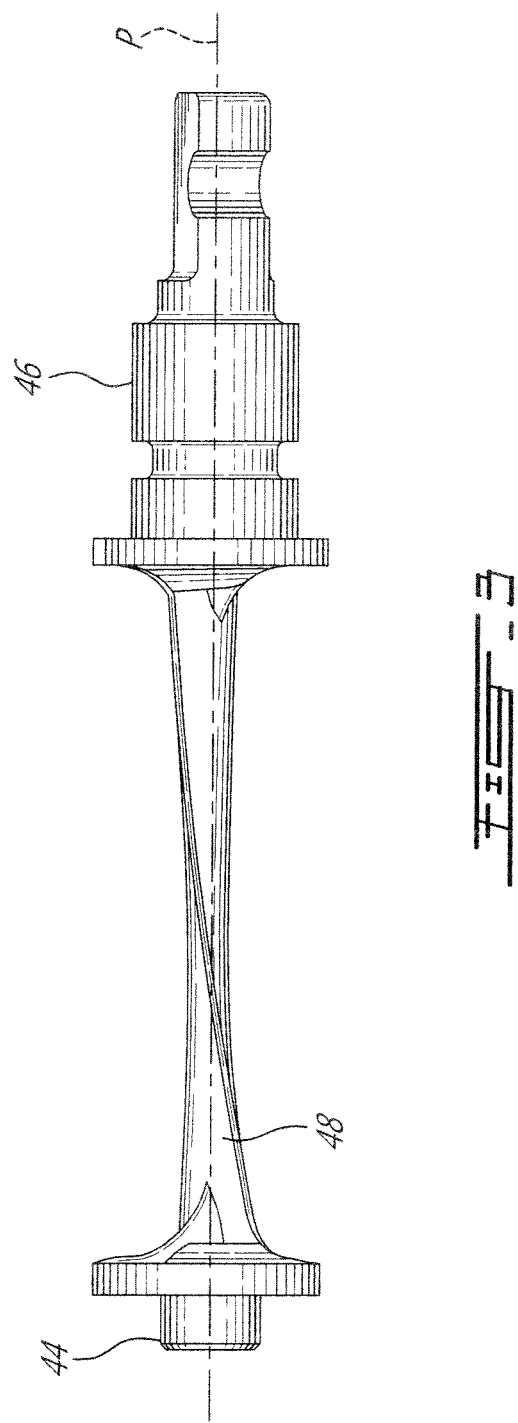

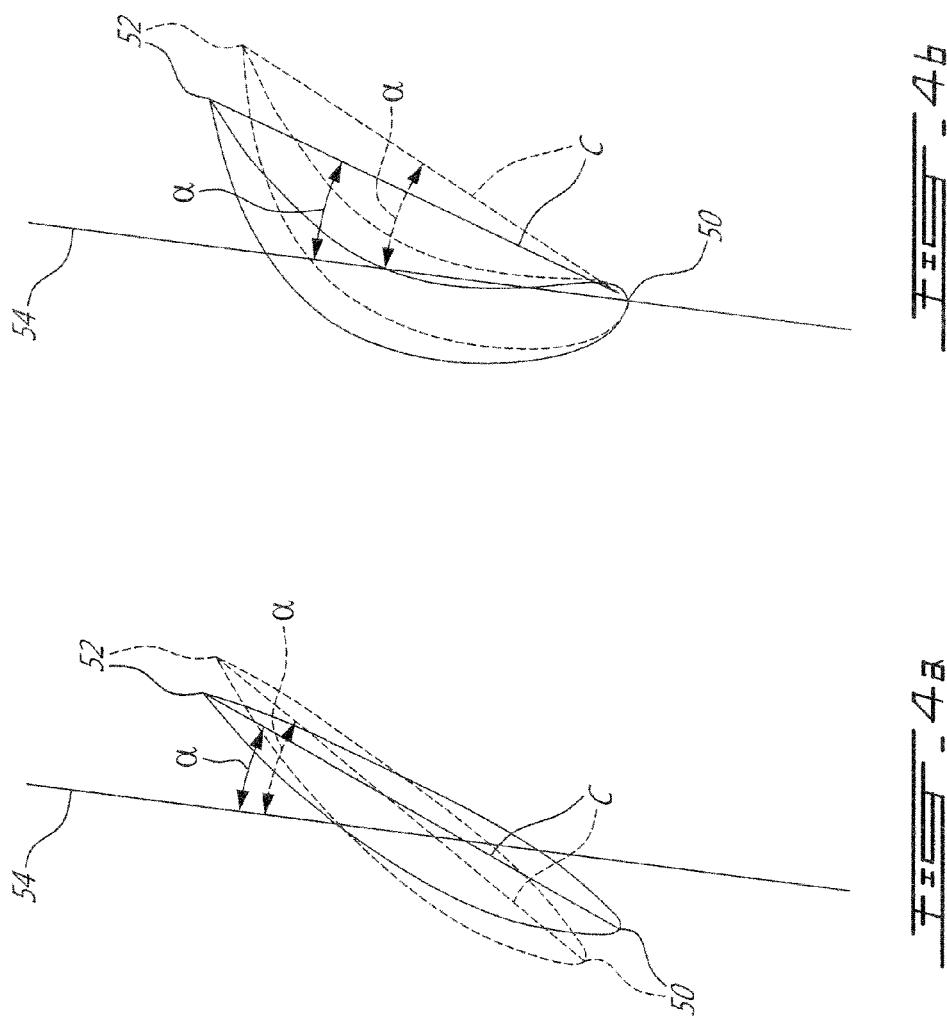

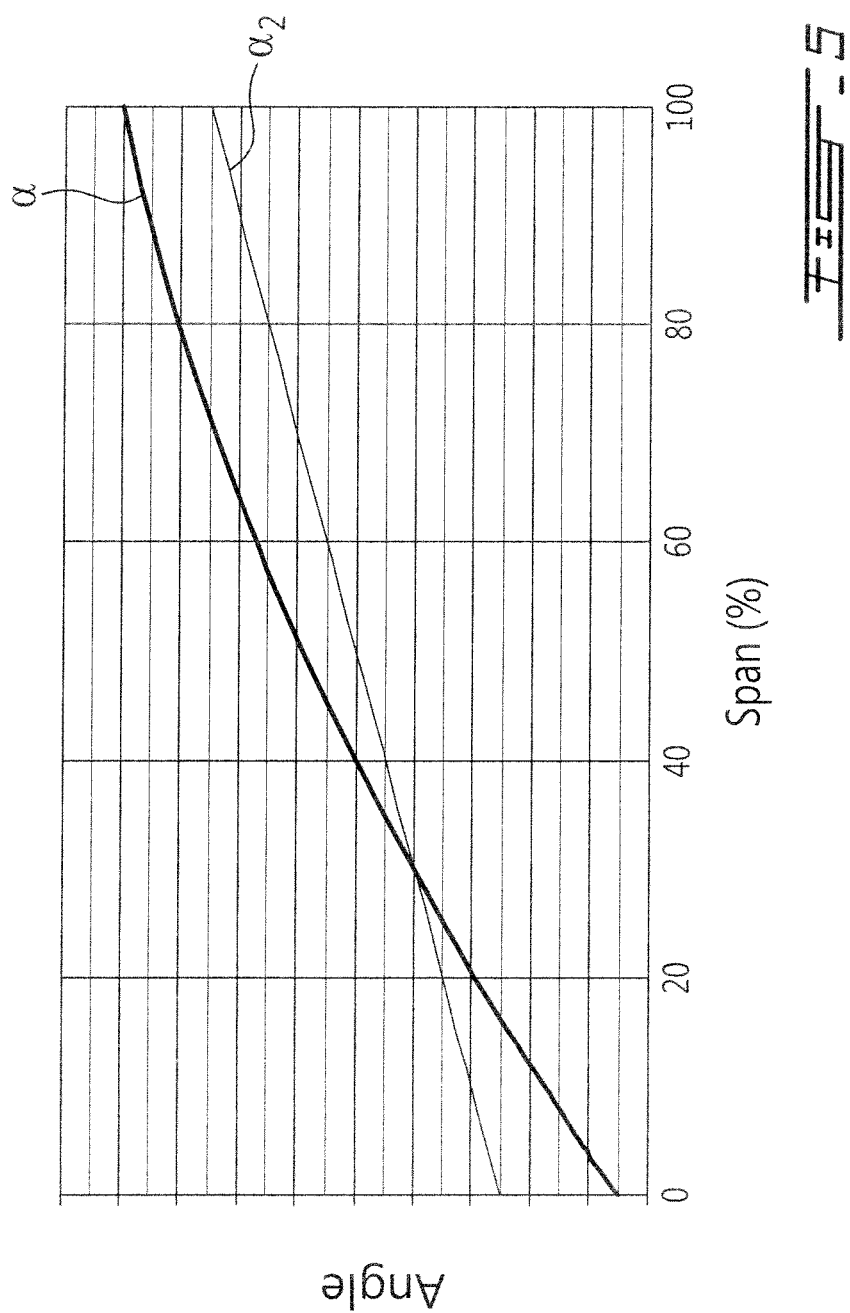

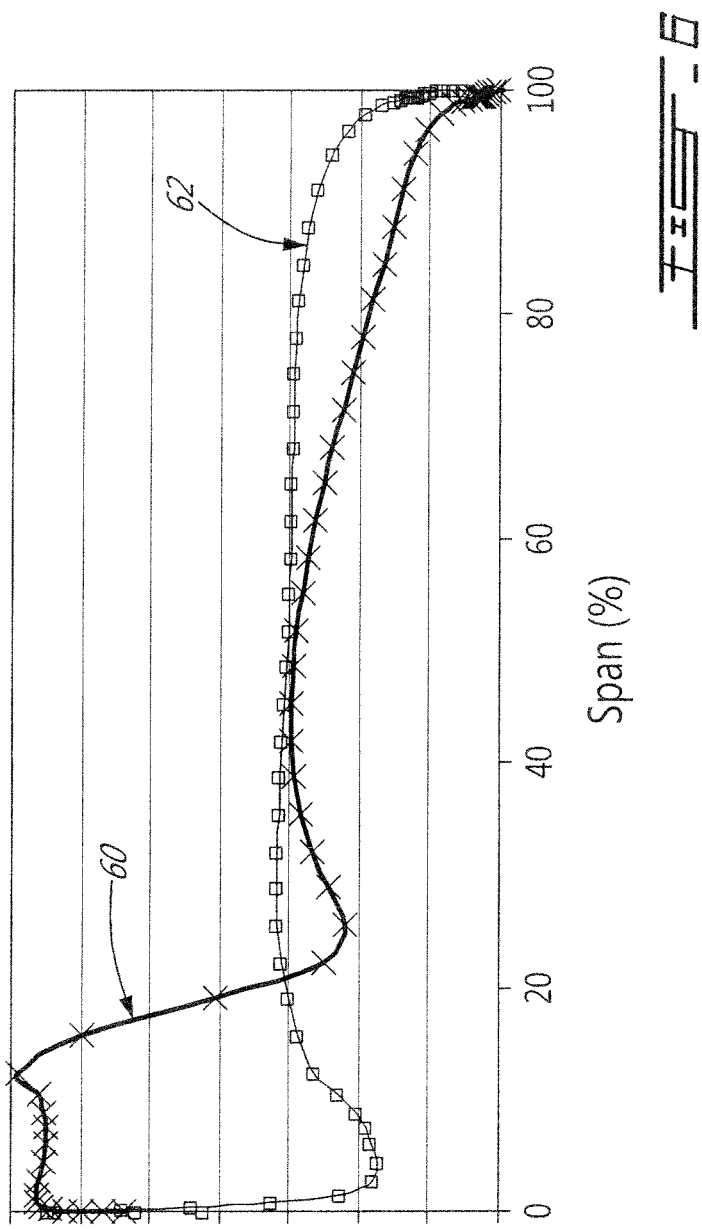

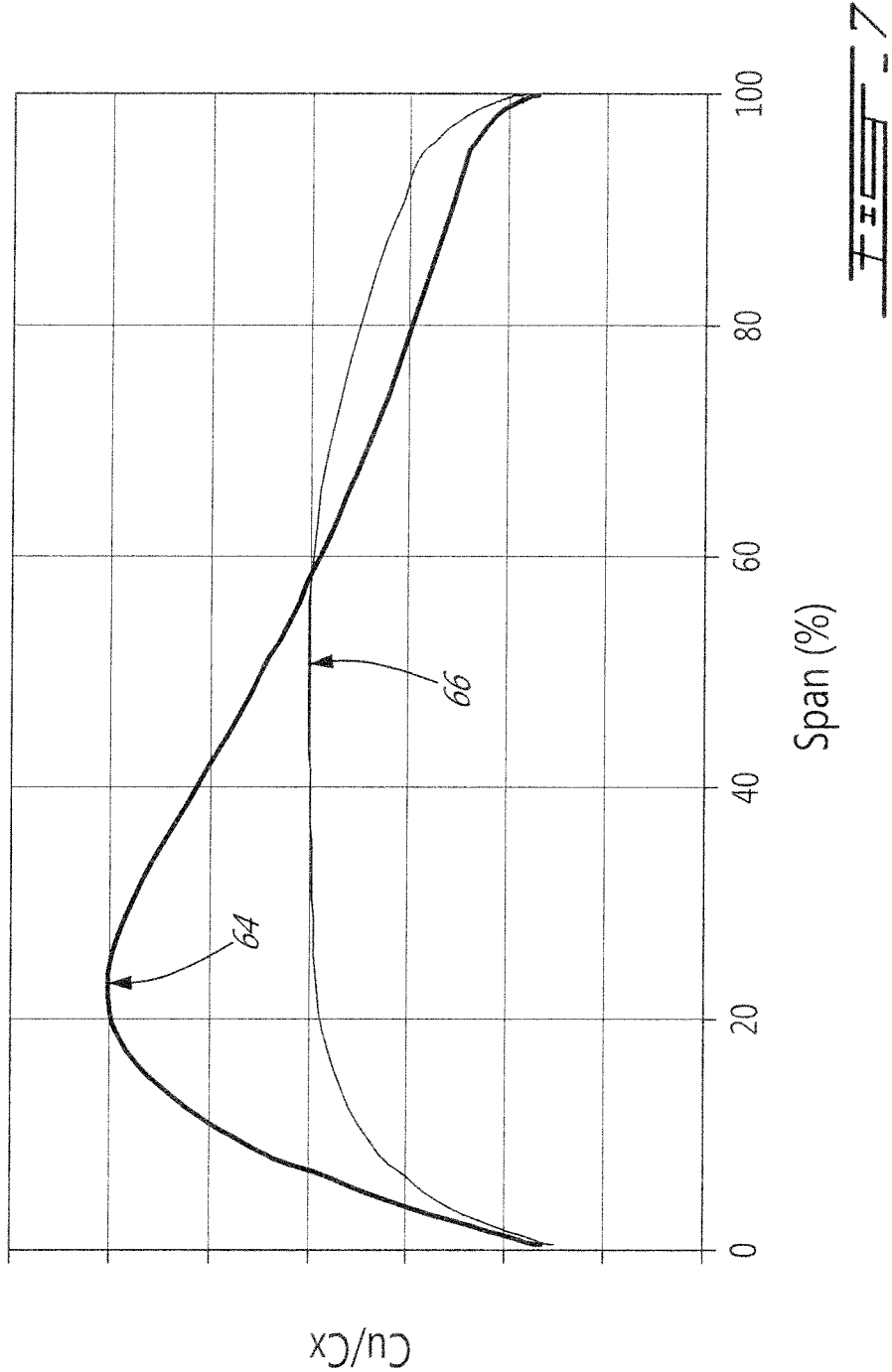

TWISTED VARIABLE INLET GUIDE VANE

TECHNICAL FIELD

The application relates generally to compressor inlets, more particularly, to variable inlet guide vanes for such inlets.

BACKGROUND OF THE ART

Variable inlet guide vanes (IGV) are used to introduce swirl into a compressor rotor to improve low speed operability as well as increase the flow capacity at high speeds. It is known to install radial IGVs directly upstream of the rotor, which provide a close-coupled direction of the flow into the rotor. An alternative is to use axial IGVs, i.e. having a pivot axis parallel to the engine axis; such may allow for a shorter engine, but usually provide a less optimum swirl profile at the rotor leading edge.

An acoustic condition called Vortex Whistle has been found to occur in compressors with axial IGVs located in radial inlets. As the air approaches a sonic condition, a loud pure tone noise is emitted. This usually occurs during ground or flight idle engine conditions with high IGV angles and is undesirable.

SUMMARY

In one aspect, there is provided a compressor for a gas turbine engine, the compressor comprising: an annular inlet duct having an annular hub side wall and an annular shroud side wall extending around the hub side wall spaced apart therefrom; at least one rotor having an array of blades mounted on a rotatable shaft, the blades extending across a flow path in fluid communication and in alignment with the inlet duct; and a plurality of circumferentially spaced apart inlet guide vanes extending across the inlet duct from the hub side wall to the shroud side wall, each vane being pivotable about a pivot axis thereof, each vane defining an airfoil portion with opposed leading and trailing edges, the airfoil portion being twisted such that at each location of the airfoil portion along the pivot axis, an angle is defined between a respective chord extending between the leading and trailing edges and a same reference plane containing the pivot axis and extending radially with respect to the compressor, the angle varying from a minimum value near the hub side wall to a maximum value near the shroud side wall, the angle being measured along a direction of rotation of the rotor.

In another aspect, there is provided an inlet guide vane for a compressor of a gas turbine engine, the vane comprising: a hub end configured to be received in a hub side of a gas path; a tip end configured to be received in an opposed side of the gas path, the hub and tip ends being aligned and defining an axis of the vane extending therethrough; and an airfoil portion extending between the hub end and the tip end, the airfoil portion defining opposed leading and trailing edges, the airfoil portion being twisted such that at each location of the airfoil portion along the axis, an angle is defined between a respective chord extending between the leading and trailing edges and a same reference plane containing the axis, the angle varying non-linearly along the axis as a function of a distance from the hub end.

In another aspect, there is provided a method of reducing vortex whistle in a radial inlet of a compressor having a shroud side wall surrounding a hub side wall thereof, the method comprising swirling a flow along a trailing edge of each one of a plurality of axial inlet guide vanes extending between the hub side and shroud side walls, wherein swirling the flow along the trailing edge includes generating a swirl having a first angle adjacent the hub side wall and generating a swirl having a second angle larger than the first angle adjacent the shroud side wall.

In a further aspect, there is provided a method of selecting a twist angle of an inlet guide vane for a compressor, the method comprising: determining a desired distribution of an angle of flow adjacent a leading edge of a corresponding blade of an adjacent rotor of the compressor; determining a variation in flow speed and in radial distance from a rotational axis of the compressor between corresponding points of the leading edge of the blade and of a trailing edge of the vane; determining a desired distribution of the angle of flow adjacent the trailing edge of the vane from the desired distribution of the angle of flow adjacent the leading edge of the blade and from the variation in flow speed and in radial distance; and selecting a twist angle distribution corresponding or approximately corresponding to the desired distribution of the angle of flow adjacent the trailing edge of the vane.

DESCRIPTION OF THE DRAWINGS

Reference is now made to the accompanying figures in which:

FIG. 3 is a schematic tridimensional view of an inlet guide vane of the compressor inlet of FIG. 1;

FIGS. 4a and 4b are exemplary cross-sections for the vane of FIG. 3, illustrating a twist angle thereof;

FIG. 5 is a graph of angle as a function of span showing an exemplary twist angle distribution for the vane of FIG. 3 and a flow angle distribution at a compressor rotor entry;

FIG. 6 is a graph of an exemplary distribution of swirl at the rotor entry as a function of span, corresponding to a straight vane and corresponding to a twisted vane such as that shown in FIG. 3; and FIG. 7 is a graph of an exemplary distribution of Cu/Cx at the rotor entry as a function of span, corresponding to a straight vane and corresponding to a twisted vane such as that shown in FIG. 3.

DETAILED DESCRIPTION

Figure 1:
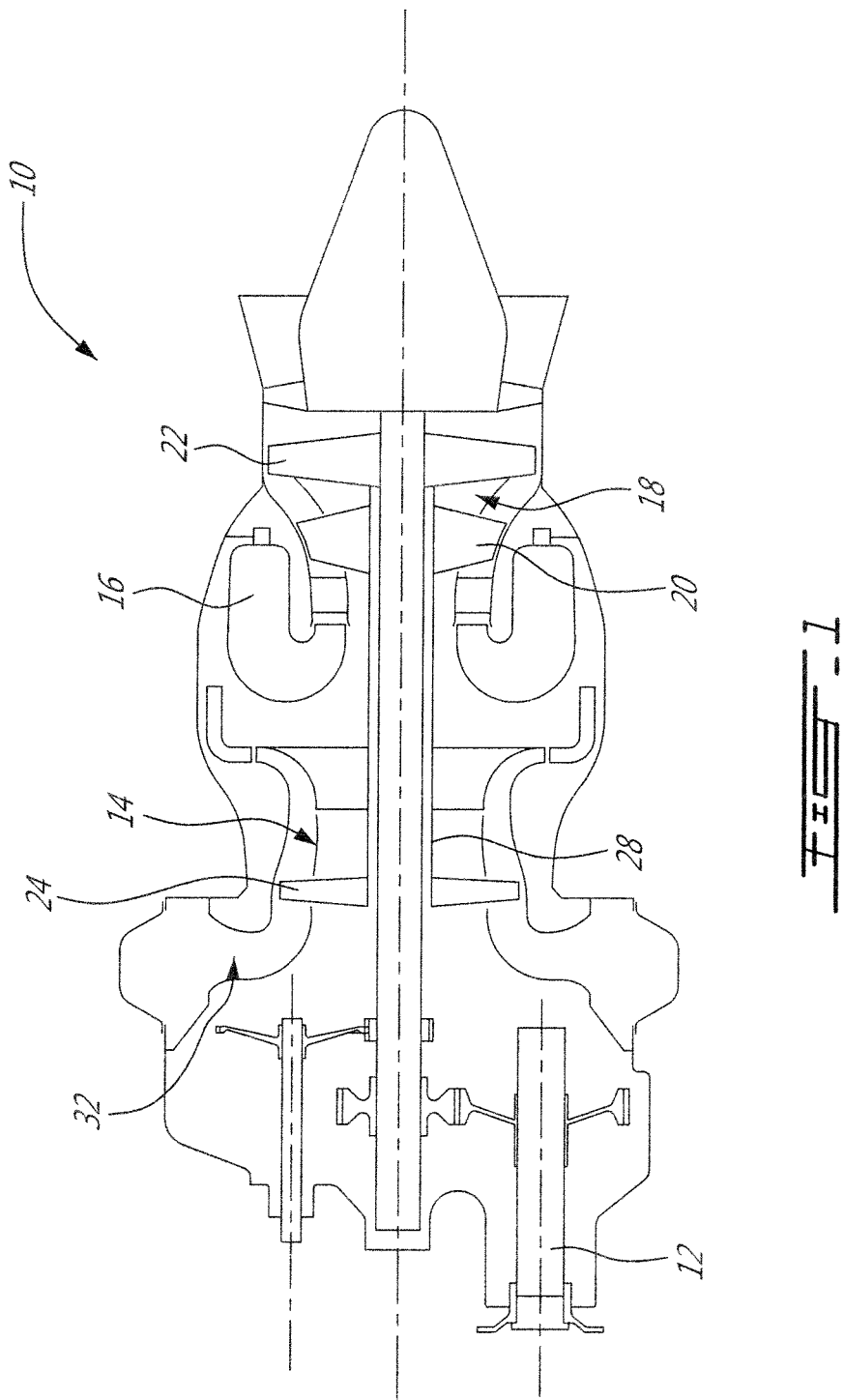
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 includes a compressor turbine 20 including turbine rotors rotating the rotors of the compressor section 14 through a common shaft, and a power turbine 22 including turbine rotors rotating an output shaft 12 of the engine 10. Although the engine 10 is depicted here as a turboshaft engine, the engine 10 may alternately be any other appropriate type of gas turbine engine, e.g. a turbofan or a turboprop.

Figure 2:
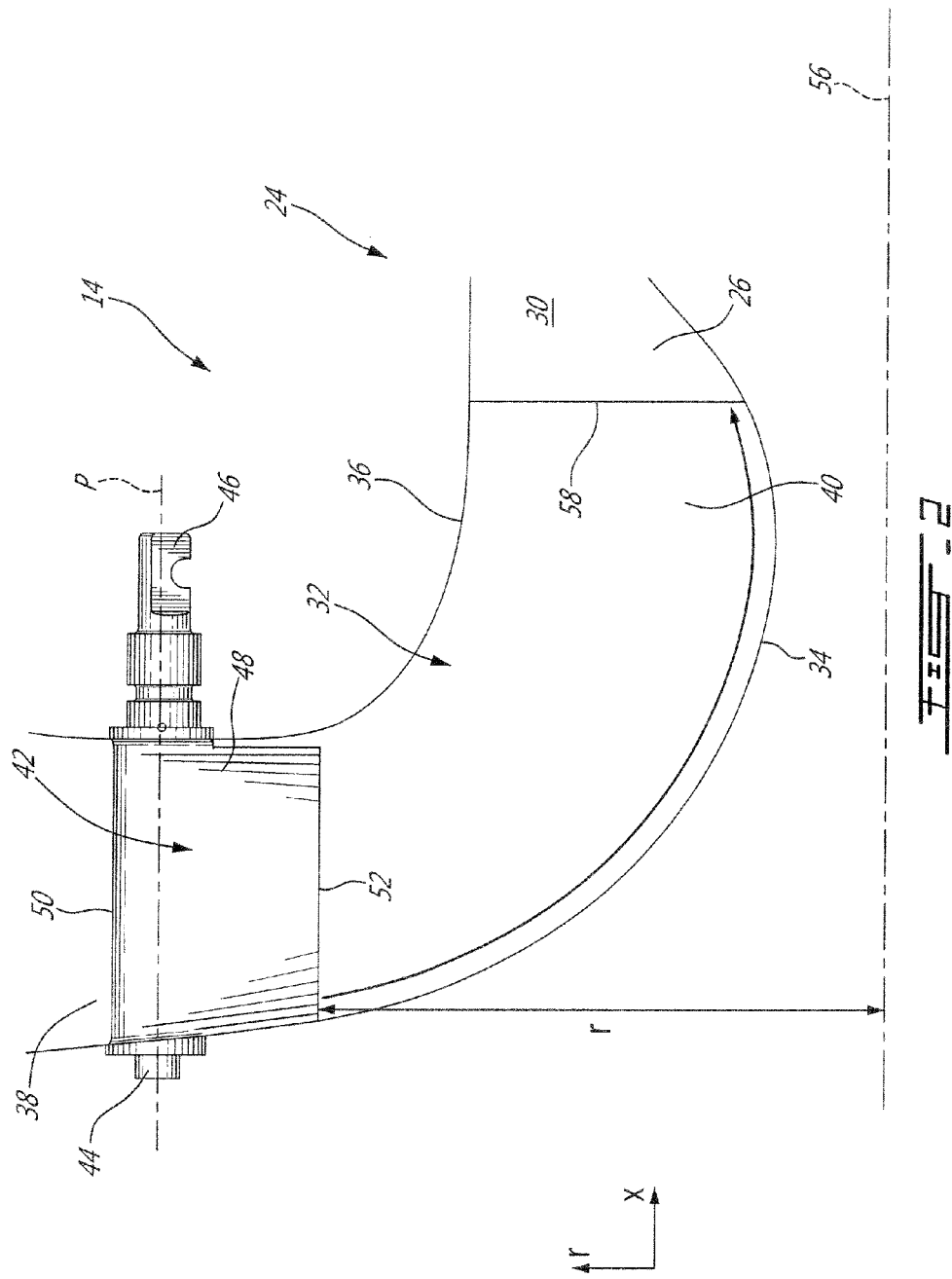
FIG. 2 is a schematic cross-sectional view of a compressor inlet which may be used on a gas turbine engine such as shown in FIG. 1.

Referring to FIG. 2, the compressor section 14 includes a first rotor 24 including an array of blades 26 (only one of which being partially shown) mounted on a rotatable shaft 28 (see FIG. 1) and extending across a flow path 30. An annular inlet duct 32 is defined by an annular hub side wall 34 and an annular shroud side wall 36 extending around the hub side wall 34. The inlet duct 32 is in fluid communication and in alignment with the flow path 30 of the compressor rotor 24, and provides the flow of air to the compressor section 14. In the embodiment shown, the inlet duct 32 defines a radial inlet, with an upstream portion 38 extending substantially along the radial direction r and a downstream portion 40 extending substantially along the axial direction x.

A plurality of circumferentially spaced apart pivotable inlet guide vanes 42 (only one of which is shown) extend across the inlet duct 32, from the hub side wall 34 to the shroud side wall 36. In the embodiment shown, the vanes 42 are located in the upstream radial portion 38 of the inlet duct 32 and the pivot axis P of each vane 42 extends substantially axially.

Each vane 42 has aligned hub and tip ends 44, 46 and an airfoil portion 48 extending between the opposed ends 44, 46, defining a leading edge 50 and a trailing edge 52. The aligned hub and tip ends 44, 46 define the pivot axis P of the vane and are pivotally received through the respective wall 34, 36. Each vane 42 is pivotable through any appropriate type of mechanism (not shown), for example a gear arrangement, a lever assembly, a pneumatic or hydraulic system, etc., engaged to one of the vane ends 44, 46.

As can be more clearly seen in FIGS. 3 and 4a-4b, the airfoil portion 48 of each vane is twisted. At each location along the pivot axis P (with two different locations being illustrated in solid and dotted lines in FIGS. 4a-4b), a chord C is defined as extending between the leading and trailing edges 50, 52, and a twist angle $\alpha$ is defined between the chord C and reference plane 54 containing the pivot axis P, with the same reference plane 54 being used for all locations along the pivot axis P. In a particular embodiment, the reference plane 54 extends radially, i.e. corresponds to the plane of FIG. 2. The twist angle $\alpha$ varies as a function of the distance from the hub end 44 along the pivot axis P, or portion of the span (with 0% span being adjacent the hub end 44 and 100% span being adjacent the tip end 46). The variation of the twist angle $\alpha$ may be obtained by pivoting the airfoil cross sections over the span (FIG. 4a) or by varying the airfoil camber over the span (FIG. 4b).

Referring back to FIG. 2, as the flow moves from the vane to the rotor entry, the change in radial distance r of the flow from the central axis 56 of the compressor section 14 is greater near the hub side wall 34 than near the shroud side wall 36. The angular velocity of the flow thus increases to maintain the angular momentum. As such, for a straight (non twisted) inlet guide vane, the resulting flow at the rotor entry has more swirl near the hub.

The relationship between the angle $\alpha_1$ of the flow at the vane trailing edge 52 and the angle $\alpha_2$ of the flow at the leading edge 58 of the first rotor blades 26 may be described as follows:

$$\tan(\alpha_1) = \frac{r_2}{r_1} \frac{C_{m2}}{C_{m1}} \tan(\alpha_2) \quad \text{(Equation 1)}$$

where $r_1$ and $r_2$ correspond to the radial distance from the central axis 56 of corresponding points (same % span) at the vane trailing edge 52 and at the rotor blade leading edge 58, respectively, and $C_{m1}$ and $C_{m2}$ correspond to the meridional velocity of the corresponding points at the vane trailing edge 52 and at the rotor blade leading edge 58, respectively. The meridional velocity $C_m$ is defined as $C_m = \sqrt{C_x^2 + C_r^2}$, where $C_x$ and $C_r$ are the flow speeds along the x and r axis, respectively.

Therefore, an appropriate distribution of swirl at the vane trailing edge 52 allows a resulting swirl at the rotor entry, or leading edge 58 of the rotor blades 26, which is more constant. The distribution of swirl at the vane trailing edge 52 is created by a distribution of the twist angle $\alpha$ of the airfoil portion 48 along the span of the vane 42. In a particular embodiment, the vane 42 is twisted to swirl the flow such that after the swirl variation created by the geometry of the inlet duct 32, the resulting flow at the rotor entry has a uniform swirl, for example a linear or constant distribution of the swirl angle $\alpha_2$, or in other words with the swirl angle $\alpha_2$ varying linearly as a function of a distance from the hub side wall 34. Other profiles may be targeted for the distribution of the swirl angle $\alpha_2$.

The vane 42 is thus twisted to generate less swirl near the hub side wall 34 (lower twist angle $\alpha$) and more swirl near the shroud side wall 36 (higher twist angle $\alpha$), with the twist angle $\alpha$ being measured in a direction corresponding to the direction of rotation of the compressor rotor 24. In a particular embodiment, the vane 42 is twisted with a non-linear distribution of the twist angle $\alpha$, or in other words with the twist angle $\alpha$ varying non-linearly along the pivot axis P as a function of a distance from the hub side wall 34. The angle $\alpha_1$ of the flow at the vane trailing edge 52 is assumed to correspond or approximately correspond to the twist angle $\alpha$ of the vane 42. As such a distribution for the twist angle $\alpha$ is selected to correspond or approximately correspond to the required distribution of the angle $\alpha_1$ of the flow at the vane trailing edge 52.

In a particular embodiment and as shown in FIG. 5, the twist angle $\alpha$ varies as a function of the span following a parabolic distribution approximating the distribution of equation 1 above, i.e. following a curve of the type $\alpha = As^2 + Bs + C$, where A, B and C are constants which are specific to the geometry of the inlet duct 32 and the characteristics of the engine 10, and where s represents the span. In a particular embodiment, such a distribution of the twist angle $\alpha$ is selected to result in a linear distribution of the angle $\alpha_2$ of the flow, or swirl distribution, at the leading edge 58 of the first rotor blades 26 as shown in FIG. 5.

In the embodiment shown, the variation of the twist angle $\alpha$ from the hub end 44 (0% span) to a mid-point between the hub and tip ends 44, 46 (50% span) is greater than a variation of the twist angle $\alpha$ from the mid-point to the tip end 46 (100% span). The twist angle $\alpha$ continuously varies in a same direction from the hub end 44 to the tip end 46. In a particular embodiment, the vane 42 pivots between a first position in which the airfoil extends substantially radially (shown in FIG. 2) and a second position in which the airfoil extends substantially circumferentially (shown in FIG. 3). With the vane 42 in the substantially radial position, in a particular non-limiting embodiment, the twist angle $\alpha$ may vary from −9° near the hub end 44 to 8° near the tip end 46 (the positive angle direction corresponding to the direction of rotation of the compressor rotor 24, with 0° corresponding to the radial direction). As such, in this example, with the vane 42 turned at 70° with respect to the radial direction r, the airfoil portion 48 near the hub end 44 has a reduced angle of 61° while the airfoil portion 48 near the tip end 46 has an increased angle of 78°. The values for the twist angle $\alpha$ near the hub end 44 and near the tip end 46 will vary according to the particular design and any other adequate values are possible.

The twist angle $\alpha$ of the inlet guide vane 42 is thus selected according to the following: first, a desired distribution of the angle $\alpha_2$ of the flow, or swirl angle, adjacent the leading edge 58 of the blades 26 of the adjacent rotor 24 is determined. Such may be, for example, a linear distribution of the flow angle $\alpha_2$, i.e. varying linearly across the span of the blade 26, as shown in FIG. 5. A variation in the flow speed $C_x$ and $C_r$ and in the radial distance r from the compressor axis 56 between corresponding points of the leading edge 58 of the rotor blade 26 of the trailing edge 52 of the vane 42 is determined. A desired distribution of the angle $\alpha_1$ of the flow, or swirl angle, adjacent the trailing edge 52 of the vane 42 is then determined from the desired distribution of the angle $\alpha_2$ of the flow adjacent the rotor blade leading edge 58, from the variation in flow speed $C_x$ and $C_r$ and from the variation in radial distance r. In a particular embodiment, this is done according to equation 1 above. The distribution of the twist angle $\alpha$ for the vane 42 is thus selected, corresponding exactly or approximately to the desired distribution of the angle $\alpha_1$ of the flow adjacent the trailing edge 52 of the vane 42. In a particular embodiment, this is a non-linear distribution, including, but not limited to, a parabolic distribution.

The distribution of the twist angle $\alpha$ may be tuned to optimize the work and pressure ratio of the first stage of the compressor section 14 to better match the operating requirements of the engine 10 and/or to reduce the rotor top speed. In a particular embodiment, the distribution of the twist angle $\alpha$ is selected based on the desired distribution of the angle $\alpha_2$ of the flow adjacent the rotor blade leading edge 58 at idle conditions. Considering the work and flow at idle to select the distribution of the twist angle $\alpha$ of the vane 42 may improve the low speed performance of the compressor section 14 without changing the higher speed performance, improving for example the ability of the engine 10 to decouple from a helicopter transmission.

In a particular embodiment, the distribution of the twist angle $\alpha$ may enable the optimization of performance, acoustics and/or operability. As illustrated in the computation fluid dynamics plot of FIG. 6, the distribution of the swirl angle $\alpha_2$ at the rotor entry for a straight vane is shown at curve 60, while the distribution of the swirl angle $\alpha_2$ at the rotor entry for a twisted vane having a twist angle $\alpha$ as per FIG. 5 is shown at curve 62, in both cases with the vane being turned to a high angle with respect to the radial direction r. It can be seen that the straight vane has high swirl in the bottom 20% of the span while the twisted vane 42 eliminates this region of extreme swirl. Accordingly, the straight vane may exhibit inlet flow separation while the twisted vane 42 removes that separation, which may significantly lower loss and provide for cleaner flow into the rotor.

In a particular embodiment, the twisted vane allows for reduction or elimination of vortex whistle. A parameter used to identify the potential for vortex whistle is $C_u/C_x$, where $C_u$ is the tangential velocity ($C_u = C_m \tan(\alpha)$) and $C_x$ is the axial velocity. As illustrated in FIG. 8, the distribution of $C_u/C_x$ over the span at a plane of 45° at the rotor entry is shown for a straight vane at curve 64 and for a twisted vane having a twist angle $\alpha$ as per FIG. 5 at curve 66. The straight vane for this particular engine is found to have a vortex whistle and correspondingly shows a large bump in $C_u/C_x$. The twisted vane has a lower peak value and a more flat distribution of $C_u/C_x$, thereby reducing the likelihood and magnitude of vortex whistle.

The twisted inlet guide vane 42 may thus benefit radial inlet compressors by reducing or eliminating vortex whistle at high vane angles and/or providing a more optimal swirl profile at entry to the first stage compressor. This may result in a lower acoustic signature, lower inlet loss and/or higher compressor efficiency at high vane angles.

The non-linear distribution of the twist angle $\alpha$ and/or combination of smaller twist angle $\alpha$ near the hub end 44 with larger twist angle $\alpha$ near the tip end 46 may also advantageously be used in non-axial inlet guide vanes and/or in inlet guide vanes located in inlet ducts having different geometries.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A compressor for a gas turbine engine, the compressor comprising:
    an annular inlet duct having an annular hub side wall and an annular shroud side wall extending around the hub side wall spaced apart therefrom;
    at least one rotor having an array of blades mounted on a rotatable shaft, the blades extending across a flow path in fluid communication and in alignment with the inlet duct; and
    a plurality of circumferentially spaced apart inlet guide vanes extending across the inlet duct from the hub side wall to the shroud side wall, each vane being pivotable about a pivot axis thereof, each vane defining an airfoil portion with opposed leading and trailing edges, the airfoil portion being twisted such that at each location of the airfoil portion along the pivot axis, an angle is defined between a respective chord extending between the leading and trailing edges and a same reference plane containing the pivot axis and extending radially with respect to the compressor, the angle varying from a minimum value near the hub side wall to a maximum value near the shroud side wall, the angle being measured along a direction of rotation of the rotor.

2. The compressor as defined in claim 1, wherein the inlet duct has an upstream portion extending substantially radially with respect to the compressor and a downstream portion extending substantially axially with respect to the compressor, the pivot axis of each vane extending substantially axially.

3. The compressor as defined in claim 1, wherein the angle varies non-linearly along the pivot axis as a function of a distance from the hub side wall.

4. The compressor as defined in claim 1, wherein a relationship between the angle and a distance from the hub side wall is defined by a parabolic curve.

5. The compressor as defined in claim 2, wherein the twist angle at a given distance from the hub side wall corresponds approximately to $\alpha_1$ as defined by $$\tan(\alpha_1) = \frac{r_2}{r_1} \frac{C_{m2}}{C_{m1}} \tan(\alpha_2),$$

where $\alpha_2$ is an angle of flow at the leading edge of a blade of the rotor at a corresponding distance from the hub side wall, $r_1$ is a radial distance between the trailing edge of the vane and a rotational axis of the compressor at the given distance from the hub side wall, $r_2$ is a radial distance between the leading edge of the blade and the rotational axis of the compressor at the corresponding distance from the hub side wall, $C_{m1}$ is a meridional velocity of the flow adjacent the trailing edge of the vane at the given distance from the hub side wall, and $C_{m2}$ is a meridional velocity of the flow adjacent the leading edge of blade at the corresponding distance from the hub side wall, with the given distance from the hub side wall and the corresponding distance from the hub side wall corresponding to a same fraction of a span of the vane and blade, respectively.

6. The compressor as defined in claim 1, wherein a variation of the angle from the hub side wall to a mid-point between the hub and shroud side walls is greater than a variation of the angle from the mid-point to the shroud side wall.

7. The compressor as defined in claim 1, wherein the each vane pivots from a first substantially radial position to a second position, and with the vane in the first position, the angle has a negative value near the hub side wall and a positive value near the shroud side wall.

8. The compressor as defined in claim 1, wherein the angle continuously varies in a same direction from the hub end to the tip end.

9. An inlet guide vane for a compressor of a gas turbine engine, the vane comprising:
a hub end configured to be received in a hub side of a gas path;
a tip end configured to be received in an opposed side of the gas path, the hub and tip ends being aligned and defining an axis of the vane extending therethrough; and
an airfoil portion extending between the hub end and the tip end, the airfoil portion defining opposed leading and trailing edges, the airfoil portion being twisted such that at each location of the airfoil portion along the axis, an angle is defined between a respective chord extending between the leading and trailing edges and a same reference plane containing the axis, the angle varying non-linearly along the axis as a function of a distance from the hub end.

10. The guide vane as defined in claim 9, wherein a relationship between the angle and the distance from the hub end is defined by a parabolic curve.

11. The guide vane as defined in claim 9, wherein a variation of the angle from the hub end to a mid-point between the hub and tip ends is greater than a variation of the angle from the mid-point to the tip end.

12. The guide vane as defined in claim 9, wherein the angle continuously varies in a same direction from the hub end to the tip end.

13. A method of reducing vortex whistle in a radial inlet of a compressor having a shroud side wall surrounding a hub side wall thereof, the method comprising swirling a flow along a trailing edge of each one of a plurality of axial inlet guide vanes extending between the hub side and shroud side walls, wherein swirling the flow along the trailing edge includes generating a swirl having a first angle adjacent the hub side wall and generating a swirl having a second angle larger than the first angle adjacent the shroud side wall.

14. The method according to claim 13, wherein swirling the flow along the trailing edge further includes generating a swirl between the hub side and shroud side walls having an angle varying non-linearly between the first angle and the second angle as a function of a distance from the hub side wall.

15. The method according to claim 14, wherein the swirl is generated such that a variation of the angle from the hub side wall to a mid-point between the hub and shroud side walls is greater than a variation of the angle from the mid-point to the shroud side wall.

16. The method according to claim 13, wherein swirling the flow along the trailing edge further includes generating a swirl between the hub side and shroud side walls having a swirl angle varying between the first angle and the second angle, a relationship between the swirl angle and a distance from the hub side wall being defined by a parabolic curve.

17. The method according to claim 13, further comprising selecting a distribution of a swirl angle along the trailing edge of each one of the vanes to produce a swirl along a leading edge of each blade of a rotor of the compressor having an angle varying linearly as a function of a distance from the hub side wall, the distribution of the swirl angle along the trailing edge of each one of the vanes including the first and second angles.

18. The method according to claim 13, further comprising selecting a distribution of a swirl angle along the trailing edge of each one of the vanes to produce a swirl along a leading edge of each blade of a rotor of the compressor selected based on a performance of the compressor at idle, the distribution of the swirl angle along the trailing edge of each one of the vanes including the first and second angles.

19. The method according to claim 13, further comprising selecting a distribution of a swirl angle along the trailing edge of each one of the vanes to produce a desired distribution of an angle of flow along a leading edge of each blade of a first rotor of the compressor, the distribution of the swirl angle along the trailing edge of each one of the vanes including the first and second angles and being determined according to $$\tan(\alpha_1) = \frac{r_2}{r_1}\frac{C_{m2}}{C_{m1}}\tan(\alpha_2),$$

where $\alpha_1$ is the swirl angle at the trailing edge of the vane at a given fraction of a span thereof, $\alpha_2$ is the angle of flow at the leading edge of the blade at the given fraction of a span thereof, $r_1$ is a radial distance between the trailing edge of the vane and a rotational axis of the compressor at the given fraction of the span of the vane, $r_2$ is a radial distance between the leading edge of the blade and the rotational axis of the compressor at the given fraction of the span of the blade. $C_{m1}$ is a meridional flow velocity adjacent the trailing edge of the vane at the given fraction of the span thereof, and $C_{m2}$ is a meridional flow velocity adjacent the leading edge of the blade at the given fraction of the span thereof.

20. A method of selecting a twist angle of an inlet guide vane for a compressor, the method comprising:
determining a desired distribution of an angle of flow adjacent a leading edge of a corresponding blade of an adjacent rotor of the compressor;
determining a variation in flow speed and in radial distance from a rotational axis of the compressor between corresponding points of the leading edge of the blade and of a trailing edge of the vane;
determining a desired distribution of the angle of flow adjacent the trailing edge of the vane from the desired distribution of the angle of flow adjacent the leading edge of the blade and from the variation in flow speed and in radial distance; and
selecting a twist angle distribution corresponding or approximately corresponding to the desired distribution of the angle of flow adjacent the trailing edge of the vane.

* * * * *